Jan. 5, 1965  J. F. D. BRUINSMA  3,164,324
SPRAYING VEHICLE
Filed May 17, 1963
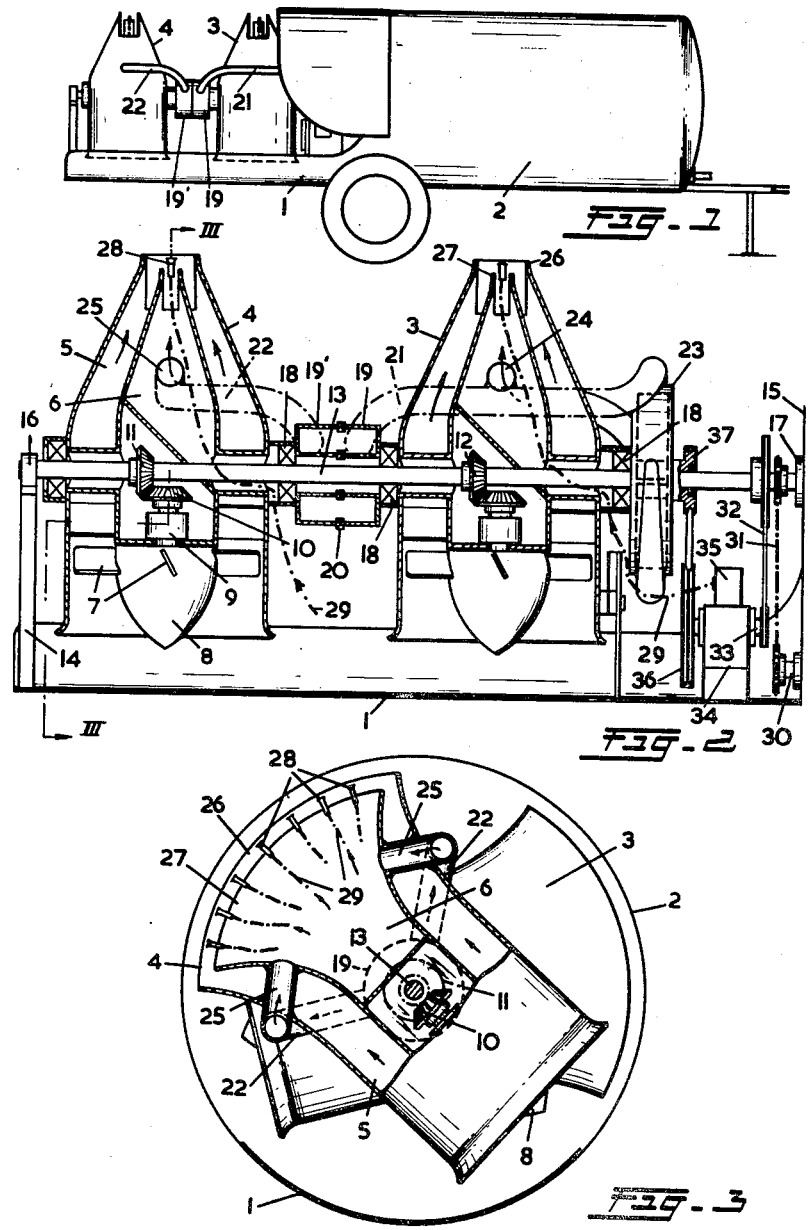
INVENTOR.
Josephus Fredericus Dominicus Bruinsma
BY Wenderoth, Lind and
Ponack, Attorneys

3,164,324
SPRAYING VEHICLE
Josephus Fredericus Dominicus Bruinsma, Dodewaard, Netherlands, assignor to Kiekens-Wervelwind-Holland (Kiekens-Whirlwind-Holland) (KWH) N.V., Wadenoijen, Netherlands
Filed May 17, 1963, Ser. No. 281,267
Claims priority, application Netherlands, May 18, 1962, 278,614
1 Claim. (Cl. 239—77)

The invention relates to a spraying vehicle for atomizing or spraying agents for combating plant diseases, which comprises at least one driven fan for generating a stream of air to issue from a nozzle adapted for rotary adjustment about the longitudinal direction of said vehicle.

It is an object of the invention to improve a vehicle of this type in such a manner that it offers better possibilities of application, and is partiuclarly capable of being wheeled over narrow paths amidst plantations and thickets and effecting therein a penetrative spray of atomized material over a wide range.

According to the invention, the said fan is an axial fan having its own axis of rotation and its nozzle directed transversely to the longitudinal axis of the vehicle. Such an axial fan offers the possibility for its outflow mouth to cover a large angular sector relative to the longitudinal axis in combination with a minimum circle circumscribing the fan transversely to and concentric with the direction of the longitudinal axis of the vehicle. This has the advantage that the vehicle is capable of passing through narrow passages in combination with a widely radiating spraying air stream. When at least two axial fans are disposed one behind the other in the longitudinal direction of the vehicle and arranged for rotary adjustment relative to each other about said longitudinal direction and having their axis of rotation and nozzles directed transversely to said longitudinal direction, the range of spraying can be very large.

According to the invention, in a spraying vehicle comprising one or more fans for generating a conveying air stream in which sprayed material is entrained, as well as one or more liquid nozzles for introducing material to be sprayed into an air stream path, there is obtained a very effective adjustability of the depth of the spray of atomized matter, when there is provided a blower generating a spraying air stream independent of but concurrent with said conveying air stream and of a pressure independent of and preferably higher than the pressure of the latter stream, said liquid nozzles terminating in said spraying air stream.

The invention will be further explained with reference to the drawings, which illustrate diagrammatically, and by way of example, an embodiment of the invention. In said drawings, FIG. 1 is a lateral view of a spraying vehicle according to the invention.

FIG. 2 is, on a larger scale than the vehicle shown in FIG. 1, a vertical cross-sectional view of the rear section, on which the fan units are mounted.

FIG. 3 is partly a rear elevation, partly a cross-sectional view of the fan units taken on the line III—III in FIG. 2, the fan units being shown in a relative position different from the other figures.

On the front section of the chassis 1 of the spraying vehicle, is mounted a liquid reservoir 2, two axial fan units 3, 4 being mounted on the rear section of the chassis 1. Each of these fan units has an outer housing 5 and, concentric therewith, an inner housing 6 disposed to define between their walls an annular channel, through which conveying air for entraining sprayed matter is blown by means of rotor blades 7 impelling the air directly parallel to their axis of rotation. The blades 7 are mounted on a rotating streamline head 8, which is carried by a shaft journalled in a block 9 mounted on an end face of the inner housing 6. The end of this shaft carries a conical gear wheel 10 which engages one of two conical gear wheels 11 and 12 mounted on the longitudinal shaft 13 across the two fan units 3, 4. The shaft 13 is journalled in bearing blocks 16, 17, mounted via a bearing support 14 on the chassis end or assembly plate 15. The fan units 3, 4 are supported via a number of bearing blocks 18 on the shaft 13. The outer housings 5 of the fan units 3, 4 are connected with each other by means of annular boxes 19, 19' mounted about the shaft 13. The annular box 19' is provided with end rabbets 20 fitting the terminal edges of the box 19, in such a manner that the fan units 3 and 4 can be turned relative to each other while the boxes 19, 19' form a permanently closed hollow ring. To this hollow ring 19, 19' are connected pairs of air conduits 21, 22. Conduits 21 extend from a centrifugal fan 23 mounted for rotation about the shaft 13, around the axial fan unit 3 to the annular box 19, while branches of the conduits 21 terminate in the inner housing of the fan unit 3 at 24. Conduits 22 extend from the annular box 19' half-way around fan unit 4 and terminate in the inner housing of fan unit 4 at 25. Via the ducting as described, the fan 23 is capable of supplying air to the two inner housings 6 of the fan units 3, 4, independently of the position in which the latter are turned relative to each other.

The housings 5, 6 of the axial fan units 3, 4 are round at their intake ends, and are flattened and at the same time flared outwardly in the peripheral direction about the shaft 13 towards their outlet ends. Hence they form slot-like nozzles 26, 27 which take up a large peripheral angle about the shaft 13 and have their terminal edges concentric relative to the shaft 13. As a consequence, the fan units 3, 4 cover large peripheral sectors relative to the shaft 13, it being possible for such sectors to be adjusted as desired. In this respect these axial fans have a great advantage over a centrifugal fan, the outflow of which is concentrated on more than one place, which place is, in addition, highly eccentric relative to the remaining part of the centrifugal fan, when the latter is arranged to be bodily adjusted by rotation about its axis of rotation. The axial fan units are divided about the adjusting shaft 13 fairly symmetrically, so that, as compared to their capacity, they take up a small transverse plane with respect to the direction of travel of the vehicle, regardless of the position of their outlet sectors. As as consequence, the spraying vehicle is capable of passing between closely spaced plantations.

In the nozzles 26, 27 of each fan unit 3 and 4, are provided a plurality of liquid spray nozzles 28, in such a manner that the effluent liquid is atomized by the air flowing out of the nozzle 27 of the inner housing, after which the air and the liquid are taken up in the air stream impelled through the outer housing 5 by the blades 6. The nozzles 28 are fed by way of flexible supply hoses 29, shown schematically in the drawings by dot-dash-lines.

As a result, the spraying air flowing through the inner housing 6 may be of a higher pressure, and hence have a higher outflow velocity, than the air stream impelled through the outer housing 5. By virture of this arrangement, the latter air stream acts a conveying air stream, in which the higher energy spraying air stream from the inner housing 6, together with the liquid particles dispersed therein, are taken up and carried along. This has the advantage that it is possible to give the spraying air the pressure and velocity suitable for the desired manner of either atomizing or spraying, and, independently thereof, the conveying air stream the rate and velocity most suitable for the penetration into the crop. Thus a large volume of conveying air per unit of time issued at a low velocity, which is suitable for a great penetrative capacity over a large area, can be loaded with a spraying air stream of a relatively high velocity, which is suitable for good atomization.

The drive of the apparatus is from a shaft 30, which is driven from a tractor or other source of power.

The shaft 30 is connected to the longitudinal shaft 13 by a chain transmission 31. The shaft 13 drives via a belt transmission 32 an input shaft 33 of a drive box 34, in which are provided transmission means for driving a liquid pump 35 for the liquid to be sprayed. From the box 34, the centrifugal fan 23 is driven via pulleys 36, 37. As a result of the transmission ratio applied in the transmission series just mentioned, the centrifugal fan 23 rotates at a substantially higher speed than the shaft 13, to provide the high pressure required for the spraying air.

I claim:

In a spraying vehicle, the combination comprising a single longitudinal extending shaft, two fan units each having axial fans, said fan units having nozzles disposed one behind the other in the longitudinal direction of the vehicle and arranged for rotary adjustment relative to each other about said longitudinal shaft and having their axes of rotation and said nozzles directed transversely to said shaft, drive means provided in each fan unit drivingly connecting said shaft to each of said axial fans to generate a conveying air stream through said nozzles, duct means terminating in an inner housing of the fan unit, a blower unit means mounted on said vehicle and adapted to generate a spraying air stream through said duct means independent of but concurrent with said conveying air stream and of a pressure independent of and higher than the pressure of the conveying air stream, a plurality of liquid nozzles to discharge spraying material spacingly arranged in each inner housing, said nozzles and said inner housing having a terminal flattened form flaring outwardly in the peripheral direction about said longitudinal shaft.

References Cited by the Examiner

UNITED STATES PATENTS

| | | | |
|---|---|---|---|
| 2,012,973 | 9/35 | Parker | 239—176 |
| 2,587,240 | 2/52 | Spreng | 239—77 |
| 2,674,494 | 4/54 | Matteson et al. | 239—78 |
| 2,736,605 | 2/56 | Spreng | 239—176 |
| 2,745,210 | 5/56 | Hild | 43—125 |
| 2,764,451 | 9/56 | Muller | 239—77 |
| 2,768,859 | 10/56 | Patterson | 239—77 |

FOREIGN PATENTS

| | | |
|---|---|---|
| 668,193 | 3/52 | Great Britain. |

LOUIS J. DEMBO, *Primary Examiner.*

EVERETT W. KIRBY, *Examiner.*